Patented May 12, 1931

1,805,294

UNITED STATES PATENT OFFICE

ERNST PREISWERK, OF BASEL, SWITZERLAND, ASSIGNOR TO HOFFMAN-LA ROCHE INC., OF NEWARK, NEW JERSEY, A CORPORATION OF NEW JERSEY

COMPOUND OF DIALKYL BARBITURIC ACIDS AND PROCESSES FOR MAKING THE SAME

No Drawing. Original application filed July 10, 1925, Serial No. 42,826, and in Switzerland July 23, 1924. Divided and this application filed December 17, 1927. Serial No. 240,939.

My invention relates to new compounds of certain dialkyl barbituric acids and 1-phenyl-2.3-dimethyl-4-dithylamino-5-pyrazolone and processes for making the same.

These compounds have the general formula:

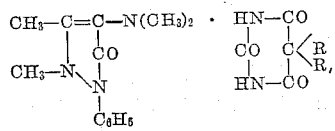

R and R' being the same or two different alkyl groups but in any compound in which either represents the iso propyl group the other does not represent the allyl group.

In my United States Letters Patent No. 1,494,127, I have described the process of melting together one molecule of iso propyl allyl barbituric acid with 1 molecule of 1-phenyl-2.3-dimethyl-4-dimethylamino-5-pyrazolone and the new compound produced thereby which contains these two constituents in molecular proportion.

I am aware of the fact that methods for producing compounds of certain dialkyl barbituric acids and 1-phenyl-2.3-dimethyl-4-dimethylamino-5-pyrazolone have been disclosed, which compounds were made by causing a reaction between one molecule of the acid and two molecules of 1-phenyl-2.3-dimethyl-4-dimethylamino-5-pyrazolone. (See United States patents to Starkenstein No. 1,459,347, Volwiler No. 1,478,463 and Thiele Nos. 1,530,021 and 1,588,554). These substances are therefore either true compounds containing one molecule of the acid and two molecules of 1-phenyl-2.3-dimethyl-4-dimethylamino-5-pyrazolone or are mixtures of 1-phenyl-2.3-dimethyl-4-dimethylamino-5-pyrazolone with a compound containing the two constituents in molecular proportion. In the former case they are not the compounds of my present invention and in the latter they comprise a mixture of one of my compounds with 1-phenyl-2.3-dimethyl-4-dimethylamino-5-pyrazolone disclosed under such circumstances that it was not known that my compounds could be produced.

I may produce my compounds either by melting together the two ingredients in molecular proportion or by dissolving them in a common solvent in any proportions and permitting the resulting compound to separate by precipitation. By a common solvent I mean a liquid medium in which both constituents will dissolve and which will permit precipitation of the specified compound. When I cause the ingredients to react in a common solvent the excess of either ingredient will remain in solution when the pure compound is precipitated. The new compounds when obtained by crystallization form clearly defined crystals. They are easily soluble in most of the organic solvents and are of value as medicines.

Example 1

231 parts of 1-phenyl-2.3-dimethyl-4-dimethylamino-5-pyrazolone are mixed with 212 parts of dipropyl barituric acid and heated to about 110° C. in a paraffin bath. As soon as the melt is clear, it is poured into a cup and stirred until it solidifies to a yellow crystal cake. After complete cooling this cake is broken up and ground. A bright yellow powder is obtained, which has a neutral reaction and melts at 91–92° C.

Example 2

208 parts of diallyl barbituric acid and 231 parts of 1-phenyl-2.3-dimethyl-4-dimethylamino-5-pyrazolone are heated in an oil bath of 130–140° C., until a clear melt is obtained. The homogeneous melt is cooled to about 70° C., if necessary seeded and stirred. It solidifies to a firm yellow cake. When cold this cake is broken up and ground.

It will be noted that in the examples, in which the ingredients are melted together, they are present in molecular proportion.

In this application I do not claim the specific process of causing isopropyl allyl barbituric acid to react with 1-phenyl-2.3-dimethyl-4-dimethylamino-5-pyrazolone nor the product of such specific process. My United States Letters Patent No. 1,494,127, already referred to, discloses this compound and the making of it by melting together the ingredients in molecular proportions. In this application I claim broadly any method of making my new compounds in isolate condition, and specifically the process of making my new compounds by melting them together in molecular proportions but I do not claim specifically the reaction in solution particularly as this method is covered even more broadly in my copending application, Serial No. 42,826, filed July 10, 1925.

While so far as I am at present advised all dialkyl barbituric acids will react with 1-phenyl-2.3-dimethyl-4-dimethylamino-5-pyrazolone to form my new compounds, I desire it to be understood that if any one or more of such acids should not so react they are not to be regarded as included in my claims. When in my claims I speak of the specified subgroup of dialkyl barbituric acids I intend to refer to all such acids excepting any which may be unsuitable as just explained and excepting isopropyl allyl barbituric acid.

Broadly speaking my invention as I now view it is based upon the discovery that dialkyl barbituric acids generally and not only isopropyl allyl barbituric acid are capable of forming compounds with 1-phenyl-2.3-dimethyl-4-dimethylamino-5-pyrazolone in which these constituents are present in molecular proportions. That it was not obvious from the disclosure of my United States Letters Patent No. 1,494,127 that dialkyl barbituric acids other than isopropyl allyl barbituric acid would form such compounds is clearly shown by the fact that the patents to others hereinabove referred to either do not disclose such compounds, or if they do disclose them, do not recognize their existence and do not disclose any process for making them in a pure state, i. e. not in admixture with an excess of the 1-phenyl-2.3-dimethyl-4-dimethylamino-5-pyrazolone ingredient.

My discovery is valuable not merely because by means of it I may produce a number of therapeutically useful compounds of dialkyl barbituric acid and 1-phenyl-2.3-dimethyl-4-dimethylamino-5-pyrazolone but also because the ingredients are recognized as being present in molecular proportions. The acid ingredient makes the compound valuable as a hypnotic while the 1-phenyl-2.3-dimethyl-4-dimethylamino-5-pyrazolone ingredient makes it valuable as an analgesic and the compounds therefore possess the valuable property of being both analgesic and hypnotic. Any compound which may contain the constituents in the proportion of 1 molecular part of the acid (hypnotic) to two molecular parts of 1-phenyl-2.3-dimethyl-4-dimethylamino-5-pyrazolone (analgesic) would exert a much greater analgesic effect in proportion to the hypnotic effect than would my compounds. If a physician should desire to produce in any one patient a higher proportion of analgesic effect to hypnotic effect than is possible for such patient with any one of my compounds, he may produce this by adding thereto a suitable amount of 1-phenyl-2.3-dimethyl-4-dimethylamino - 5 - pyrazolone and this amount he may vary within any desired limits and more particularly without adding to my compound an amount of 1-phenyl-2.3-dimethyl - 4 - dimethylamino - 5 - pyrazolone equal to or greater than the amount of said ingredient already embodied in such compound. Obviously with a compound which already contains two molecular parts of 1-phenyl - 2.3 - dimethyl-4-dimethylamino-5-pyrazolone to one molecular part of the acid he might, in many, if not in most cases, be compelled to use more than the desired additional amount of analgesic. The same would be true if the processes for which it is claimed that they produce such a compound, in fact produce only a mixture of a compound containing the constituents in molecular proportion and an excess of one molecular part of 1-phenyl-2.3-dimethyl - 4 - dimethylamino-5-pyrazolone, if such fact were recognized.

I do not claim the specific process of causing diethyl barbituric acid to react with 1 phenyl - 2.3-dimethyl-4-dimethylamino-5-pyrazolone, or the product of such specific process, because I have been shown, in an interference proceeding in which this application has been involved, an application by another inventor which in accordance with the relevant statute is entitled to priority with respect to this specific process and product.

Example 2 shows that I use the word "dialkyl" as covering both the saturated and the unsaturated radical; in other words, that I cover broadly by this term the monovalent aliphatic hydrocarbon radicals.

I claim:

1. As new products, the isolated compounds of the general formula

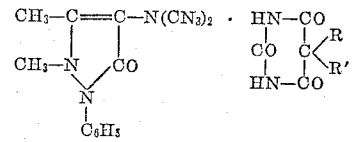

wherein R and R' are the same or two different alkyl groups but in any compound in which either represents the isopropyl group the other does not represent the allyl group and in any compound in which either represents the ethyl group the other does not represent the ethyl group.

2. The process of making the isolated compounds specified in claim 1 which comprises melting one molecule of a substance having the following formula

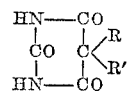

R and R' being the same or two different alkyl groups but in any compound in which either represents the isopropyl group the other does not represent the allyl group and in any compound in which either represents the ethyl group the other does not represent the ethyl group, with no more than one molecule of 1-phenyl-2.3-dimethyl-4-dimethylamino-5-pyrazolone.

3. As a new composition of matter a mixture of compounds such as specified in claim 1 and 1-phenyl-2.3-dimethyl-4-dimethyl-amino-5-pyrazolone, said mixture as a whole containing substantially less than two molecular parts of 1-phenyl-2.3-dimethyl-4-dimethylamino-5-pyrazolone to one molecular part of the acid.

ERNST PREISWERK.